United States Patent [19]
Souma et al.

[11] 3,910,963
[45] Oct. 7, 1975

[54] METHOD FOR MANUFACTURE OF CARBOXYLIC ACIDS OR DERIVATIVES THEREOF

[75] Inventors: Yoshie Souma, Ibaragi; Hiroshi Sano, Ikeda, both of Japan

[73] Assignee: Agency of Industrial Science & Technology, Tokyo, Japan

[22] Filed: Sept. 6, 1973

[21] Appl. No.: 394,623

[30] Foreign Application Priority Data

| | | |
|---|---|---|
| Sept. 13, 1972 | Japan | 47-92296 |
| Sept. 29, 1972 | Japan | 47-98367 |
| Oct. 11, 1972 | Japan | 47-102082 |
| Oct. 12, 1972 | Japan | 47-102464 |
| Nov. 7, 1972 | Japan | 47-111549 |

[52] U.S. Cl. ............... 260/343; 252/56 S; 424/311; 424/312; 424/313; 260/345.5; 260/413; 260/476 N; 260/514 M; 260/533 A
[51] Int. Cl.² ............... C07C 51/12; C07C 51/14; C07D 309/30
[58] Field of Search...252/476 N; 260/533 A, 343.5, 260/343, 413, 514 M, 537 R

[56] References Cited
OTHER PUBLICATIONS

Saegusa et al., Chemical Abstracts, Vol. 72, Abst. No. 21449e (1970).
Souma et al., Chemical Abstracts Vol. 74, Abst. No. 11515 u (1971) (abst. of Souma et al., Kogyo Kagaku Zasshi 1970, Vol. 73, p. 2723).
Sokolskii et al., Chem. Abstracts Vol. 75, Abst. 151312c (1971).
Falbe, Carbon Monoxide In Organic Synthesis, Frontis Page, Table Pages VIII to IX, pp. 78 to 95 and 104–105, Berlin, Germany 1970.

*Primary Examiner*—John D. Randolph
*Attorney, Agent, or Firm*—Oblon, Fisher, Spivak, McClelland & Maier

[57] ABSTRACT

In the manufacture of carboxylic acids or derivatives thereof by chemical addition, in strong acids, of carbon monoxide to corresponding raw materials such as olefins, alcohols, branched saturated compounds and other hydrocarbons, ions of metals belonging to group IB of the Periodic Table are caused to exist in said strong acids to induce formation of metal carbonyls and the raw materials are allowed to react with carbon monoxide which is the constituent part of the formed metal carbonyls. As the carbon monoxide in strong acids is consumed by the reaction of the raw materials, metal ions are bonded with carbon monoxide from the gaseous phase to form metal carbonyls again. Thus, a large quantity of carbon monoxide always remains dissolved in strong acids to permit the reaction to proceed under mild conditions, enabling the desired products to be selectively obtained in high yields.

7 Claims, No Drawings

METHOD FOR MANUFACTURE OF CARBOXYLIC ACIDS OR DERIVATIVES THEREOF

BACKGROUND OF THE INVENTION

This invention relates to a method for the manufacture of carboxylic acids or derivatives thereof.

The methods which have heretofore been known for the chemical addition of carbon monoxide to olefins or alcohols for the production of corresponding carboxylic acids are represented by Reppe Process which utilizes metal carbonyls and Koch Process (U.S. Pat. No. 2,831,877) which uses acid catalysts.

The Reppe Process requires severe reaction conditions of high temperature and high pressure. The Koch Process causes olefins and carbon monoxide to react in concentrated sulfuric acid at temperatures of not more than 100°C under 100 atmospheres. This reaction proceeds at an extremely low velocity, tends to entail a secondary reaction, suffers from low yields of products and barely produces a mixture consisting preponderantly of tertiary carboxylic acids.

A primary object of this invention is to provide a method for obtaining, selectively in high yields, tertiary carboxylic acids or derivatives thereof by causing alcohols, olefins, branched saturated compounds, etc. to react with carbon monoxide under mild conditions.

SUMMARY OF THE INVENTION

To accomplish the object described above, the method of this invention, in effecting chemical addition of carbon monoxide, in strong acids, to olefins, alcohols, branched saturated compounds and other similar compounds and consequently producing corresponding carboxylic acids or derivatives thereof, causes such metal ions as are capable of forming metal carbonyls to exist in the strong acids, introduces carbon monoxide thereto to have a large quantity of carbon monoxide remain dissolved in the form of metal carboxyls in the strong acids and causes the raw materials to react with said carbon monoxide to afford corresponding carboxylic acids or derivatives thereof. As the carbon monoxide in strong acids is consumed, the metal ions in the strong acids combine themselves with carbon monoxide from the gaseous phase to give rise to metal carbonyls, enabling a large quantity of carbon monoxide to remain dissolved in the strong acids at all times. Since the metal carbonyl exists in strong acid, the carbon monoxide is not required to be dissolved into strong acids by means of high pressure, and, moreover, the addition reaction does not entail such secondary reactions as polymerization. Tertiary carboxylic acids or derivatives aimed at can be selectively obtained in an uncombined form under mild reaction conditions in high yields.

Other objects and other characteristics of the present invention will become apparent from the description to be given in further detail herein below.

DETAILED DESCRIPTION OF THE INVENTION

In strong acids, alcohols and olefins are generally converted to alkyl cations, which undergo rearrangement into tertiary alkyl cations. The inventors have experimentally ascertained that carbon monoxide is chemically added to said tertiary alkyl cations. For elevating the velocity of the addition reaction of carbon monoxide while preventing occurrence of such secondary reactions as isomerization and polymerization, it is necessary to heighten the concentration of carbon monoxide in such solutions. Unfortunately, the solubility of carbon monoxide in strong acids is extremely low (about $10^{-3}$ mol/liter under atmospheric pressure), so that only a small quantity of carbon monoxide can remain dissolved even under increased pressure. Those alkyl cations which do not react with carbon monoxide, react with other substances in acids, inducing secondary reactions such as polymerization.

When the Koch reaction is effected in sulfuric acid, the yields are low and the products are diverse despite application of increased pressure to the reaction system, probably because the carbon monoxide concentration in the solution is low. The Koch reaction, therefore, generally produces polymerized tertiary acids. Under an extremely high pressure the ratio of polymerized acid decreases, but the purity of tertiary carboxylic acids in the product is lowered and a large quantity of secondary carboxylic acids occurs. A possible explanation is that, under an extremely high pressure, the alkyl cation formed in the initial phase undergoes a reaction before the time matures for rearrangement into a tertiary alkyl cation.

In view of the actual state of affairs mentioned above, the inventors have inferred a possibility that tertiary carboxylic acids will be obtained in high yields under mild conditions without permitting occurrence of polymerization under low pressure or formation of secondary carboxylic acids under high pressure, a dilemma inherent to the Koch Process, only if a large quantity of carbon monoxide is allowed to remain dissolved in the solutions and left amply to be reacted upon by tertiary alkyl cations instead of resorting to application of pressure. They have searched for such substances as are capable of retaining carbon monoxide and consequently discovered that monovalent ions of the elements belonging to group IB, such as copper, of the Periodic Table of Elements form metal carbonyls in strong acids such as sulfuric acid, hydrogen fluoride, fluosulfonic acid, phosphoric acid and boron fluoride complexes and that a large quantity of carbon monoxide can be caused to remain dissolved in strong acids by making effective use of the behavior of said monovalent ions. Hence, they have accomplished the present invention.

Specifically, the present invention can selectively obtain tertiary carboxylic acids or derivatives thereof in high yields under mild reaction conditions by adding such substances as are capable of forming monovalent ions of metals of group IB of the Periodic Table, introducing therein carbon monoxide thereby giving rise to corresponding metal carbonyls and causing addition reaction of carbon monoxide to olefins, alcohols, branched saturated compounds and other similar hydrocarbons.

Examples of the strong acid which can be used as the solvent for the present invention include sulfuric acid, hydrogen fluoride, fluosulfonic acid, phosphoric acid and boron fluoride complexes. These strong acids are used either individually or in combination. The concentration of the solvent is desired to exceed 80%. If it is not more than 80%, then the reaction velocity is greatly lowered for a possible reason to be explained afterward.

The boron fluoride complexes which are usable as strong acids in the present invention are those known complexes which boron fluoride forms with methanol, pyridine, phenols, ethylether, n-butyl ether, acetic acid, etc.

The solubility of carbon monoxide in said strong acids such as, for example, 100% sulfuric acid is about $10^{-3}$ mol/liter under the atmospheric pressure. An increase in the pressure under which carbon monoxide is introduced into the solvent does not bring about an appreciable increase in the carbon monoxide concentration in the solvent.

When a substance capable of forming the ion of a metal belonging to group IB of the Periodic Table of Elements is added to a strong acid and carbon monoxide is then introduced therein, there is consequently formed a corresponding metal carbonyl as indicated by the following formula.

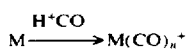

(wherein, M stands for copper, silver or gold and $n$ an integer having the value of 1–3).

The metal carbonyl which is formed in said strong acid is an unstable substance. When another substance readily reactive with carbon monoxide is supplied into the acid, the CO moiety of the metal carbonyl separates itself, while leaving the metal ion moiety, and reacts with the newly introduced substance. In the meantime, the metal ion combines itself with the carbon monoxide from the gaseous phase to resume the form of metal carbonyl as shown below.

$Cu(CO)_3^+ \rightleftarrows Cu(CO)^+ + 2CO$
$Ag(CO)^+ \rightleftarrows Ag^+ + CO$
$Au(CO)^+ \rightleftarrows Au^+ + CO$ As shown above, the metal carbonyls which function as the catalyst are $Cu(CO)_3^+$, $Ag(CO)^+$ and $Au(CO)^+$. These metal carbonyls can exist only in strong acids having a concentration not less than 80%. They exhibit very little catalytic activity in strong acids having a concentration not more than 80%. When the strong acids are maintained at a concentration not less than 80%, the metal carbonyls which function as the catalyst can exist and at the same time olefins or alcohols being used as the raw materials can be ionized into tertiary alkyl cations.

Take 1-butene, for example. When 1-butene is introduced into a strong acid, it is ionized into an alkyl cation, which is readily reactive with carbon monoxide. If the strong acid contains a metal carbonyl, then the CO moiety of the metal carbonyl separates itself from the metal ion moiety and reacts with the alkyl cation to produce pivalic acid as indicated by the following formula. The metal ion, on the other hand, combines itself with carbon monoxide from the gaseous phase to resume the form of metal carbonyl.

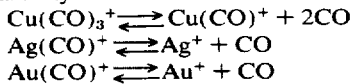

As the carbon monoxide in the strong acid is consumed through reaction with the alkyl cation, it is replenished from the gaseous phase so that carbon monoxide is at all times retained amply in the form of a metal carbonyl within the strong acid. The raw material, therefore, reacts with the carbon monoxide under mild reaction conditions to produce a corresponding carboxylic acid or derivative thereof quantitatively.

The amount of the metal of group IB of the Periodic Table to be added to the strong acid suffices in the range of 0.001 to 2.0 mol/liter. Any excess of the upper limit of said range brings about very little improvement to the yield.

In 100 ml of 100% sulfuric acid, 0.2 mol of octene-1 was left to react for two hours at normal room temperature under atmospheric pressure in the presence of a copper or silver catalyst. The yields of tertiary $C_9$ carboxylic acid in this case were as shown in Table 1.

Table 1

| Amount of $Cu^+$ (mol) added | Yield (%) | Amount of $Ag^+$ (mol) added | Yield (%) |
|---|---|---|---|
| 0 | 9 | 0 | 9 |
| 0.015 | 85 | 0.015 | 80 |
| 0.05 | 94 | 0.05 | 92 |
| 0.2 | 95 | 0.2 | 94 |
| 0.5 | 95 | 0.5 | 94 |

It is clearly seen from the table that copper ion and silver ion have a substantially equal catalytic capacity and that the sufficient amount of metal catalyst to be added is 0.2 mol/liter.

These metals, therefore, may effectively be used separately of each other. When copper and silver are used in combination, however, the yield is improved compared with the case in which they are used individually as shown in Table 2 below.

Table 2

| Catalyst used (molar ratio) | | Yield (%) |
|---|---|---|
| Copper | Silver | |
| 1 : 0 | | 85 |
| 0.9 : 0.1 | | 86 |
| 0.5 : 0.5 | | 92 |
| 0.1 : 0.9 | | 85 |
| 0 : 1 | | 79 |

The data of Table 2 represent the yields of tertiary $C_7$ carboxylic acid which were obtained when 1-hexene was left to react for 20 minutes in 100 ml of 100% sulfuric acid containing copper and silver in varying amounts to give the indicated molar ratios and a combined gram molecular weight corresponding to 0.01 mol. The reaction was carried out at 25°C under the atmospheric pressure, using carbon monoxide having 99% of purity.

When the carbon monoxide to be used happens to contain air as an impurity, the copper which is monovalent is gradually oxidized and turned into a divalent copper and, consequently, is deprived of the catalytic ability. In 100 ml of sulfuric acid containing a copper compound or a silver compound either independently or in combination, octene-1 was left to react in the presence of carbon monoxide of varying concentration (with air contained to fill the balance to make up 100%). Consequently, there were obtained the results as shown in Table 3.

Table 3

| Metal catalyst | | Concentration of carbon monoxide | 100% | 90% | 70% | 50% |
| --- | --- | --- | --- | --- | --- | --- |
| Cu₂O | 0.02 mol | | 94 | 85 | 30 | 10 |
| Ag₂O | 0.02 mol | | 92 | 90 | 90 | 90 |
| Cu₂O | 0.01 mol | } | 93 | 90 | 90 | 90 |
| Ag₂O | 0.01 mol | | | | | |

When the carbon monoxide to be used contains impurities, therefore, it is advantageous to use silver alone or copper and silver in combination. Sole use of gold is not so effective as shown in Table 4 and is not practical also from the economic point of view. Desirably gold may be used in combination with copper or silver. The data of Table 4 represent the yields of tertiary $C_{11}$ carboxylic acid which were obtained by using 1-decene as the raw material. The reaction conditions in this case were the same as those under which the data of Table 2 were obtained.

Table 4

| Catalyst used (molar ratio) | | Yield |
| --- | --- | --- |
| Copper 1 | : Gold 0 | 88% |
| 0.99 | : 0.01 | 92% |
| 0.9 | : 0.1 | 92% |
| Silver 1 | : Gold 0 | 82% |
| 0.99 | : 0.01 | 90% |
| 0.9 | : 0.1 | 91% |

When metallic copper is used alone, it is gradually dissolved in sulfuric acid and converted to a monovalent copper ion, which combines itself with carbon monoxide to produce a copper carbonyl ion solution. The mixture of a divalent copper compound and a metallic copper is similarly converted to a monovalent copper ion in the strong acid and the ion forms copper carbonyl through combination with carbon monoxide as shown by the formula given below. When the divalent copper compound is used alone, it fails to form copper carbonyl.

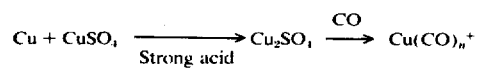

Metallic copper and various copper compounds were used at 30°C under 1 atmosphere and the amounts of carbon monoxide absorbed were measured. The results are shown in Table 5.

Table 5

| | Copper compound | Strong acid | Amount of CO absorbed (CO/Cu) |
| --- | --- | --- | --- |
| I | Copper dust | 98% sulfuric acid | 1.35 |
| II | Cupric sulfate + copper dust | 98% sulfuric acid + boron fluoride | 1.33 |
| III | Cupric oxide + copper dust | 95% hydrogen fluoride | 1.30 |
| IV | Cupric acetate + copper dust | 100% fluosulfonic acid | 1.40 |
| V | Cupric sulfate | 98% sulfuric acid | 0 |
| VI | None | 98% sulfuric acid | 0 |

In the copper carbonyl catalyst solutions prepared as shown in Table 5, 19 ml (100 m.mol) of 1-octene and 10.1 ml (100 m.mol) of cyclohexene were respectively added and the yiedls of their respective carboxylic acids were determined. The results are shown in Table 6.

Copper dust, copper grains and copper flakes are used as metallic copper having a valency of 0. Examples of the divalent copper compound to be used herein Table 6

| | Yield of tert. $C_9$ carboxylic acid from 1-octene | Yield of methylcyclopentane carboxylic acid from cyclohexene |
| --- | --- | --- |
| I | 95% | 75% |
| II | 92 | 70 |
| III | 93 | 72 |
| IV | 95 | 80 |
| V | 5 | 1 |
| VI | 5 | 1 |

As concerns the form of the catalyst to be added, cuprous oxide and cuprous sulfate are used as sources of monovalent copper ions, silver oxide, silver sulfate and silver carbonate as sources of monovalent silver ions, and aurous oxide as a source of monovalent gold ion. Incidentally, chlorides, bromides, iodides, cyanides and sulfates which are most widely known as monovalent compounds of the elements of group IB of the Periodic Table are entirely ineffectual in this respect.

The monovalent copper compound mentioned above may be substituted with metallic copper having a valency of 0 or a mixture of a divalent copper compound and metallic copper.

include cupric oxide, cupric sulfate, cupric acetate and basic copper carbonate.

Although the increase in the reaction temperature contributes to heightening the reaction velocity, it tends to decrease the solubility of carbon monoxide and encourage occurrence of secondary reactions such as polymerization. Particularly at temperatures higher than 80°C, sulfuric acid undergoes reduction to give rise to sulfurous acid gas and sharply decrease the yield of the product. When the reaction temperature falls below 0°C, the reaction velocity is lowered despite the fact that the solvent has its viscosity increased and the absolute amount of carbon monoxide retained within the solvent is increased. The reaction temperature, therefore, is desirable in the range of 0° to 50°C.

Generally carbon monoxide combines itself with the monovalent metal ion in the strong acid even under normal pressure. Thus, no application of pressure is required. Under an increased pressure, the reaction proceeds easily in consequence of an increase in the value of $n$ in the molecule of the metal carbonyl $M(CO)_n$. Generally, the increase of pressure is effective up to about 5 atmospheres. An increase beyond this level of pressure is not observed to bring about any appreciable improvement in the yield.

When an alcohol or olefin is used as the starting material, the reaction velocity generally increases with the increasing number of carbon atoms possessed thereby. The reaction velocity is rather low in the case of butane and butanol (those having 4 carbon atoms), slightly higher in the case of having 5 and 6 carbon atoms and quite high in the case of those having 7 or more carbon atoms. When an alcohol or olefin having 5 or less carbon atoms is used as the starting material, a corresponding lower carboxylic acid can be obtained in high yields by allowing the reaction to proceed under a slightly increased pressure.

An alcohol, when introduced into a strong acid, undergoes proton addition and dehydration and converts itself to an alkyl cation as shown by the following formula. The alkyl cation thus formed is isomerized into a most stabilized tertiary alkyl cation, which thereafter reacts with the carbon monoxide moiety of the metal carbonyl and converts itself into a corresponding tertiary carboxylic acid.

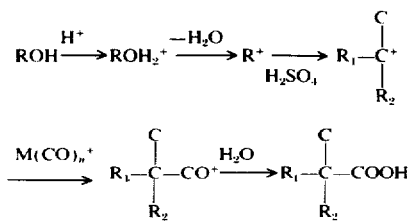

An olefin, when introduced into a strong acid, undergoes proton addition and converts itself into an alkyl cation, which then reacts with carbon monoxide from the metal carbonyl and converts itself into a corresponding tertiary carboxylic acid as shown by the following formula.

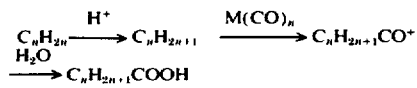

Table 7 shows the products and their yields which were obtained by using 100 ml of 98% sulfuric acid and 3.18g of cuprous oxide at 30°C to produce copper carbonyl catalyst and thereafter introducing therein a various alcohols or olefins in an amount of 0.1 mol as the starting raw material.

Table 7

| Raw material | Pressure of CO | Yield | Product |
|---|---|---|---|
| 1-Propanol | 1 atm. | 18% | 2-Methyl propionic acid |
| Same as above | 10 | 98 | Same as above |
| 1-Propylene | 8 | 98 | Same as above |
| 2-Methyl propanol | 1 | 56 | 2,2-Dimethyl propionic acid |
| 1-Butene | 7 | 98 | Same as above |
| 1-Pentanol | 1 | 62 | 2,2-Dimethyl butanoic acid |
| Same as above | 3 | 99 | Same as above |
| 1-Hexanol | 1 | 85 | A 3:1 mixture of 2,2-dimethyl pentanoic acid and 2-methyl-2-ethyl butanoic acid |
| 1-Hexene | 1 | 85 | Same as above |
| 2-Octanol | 1 | 92 | A 4:2:1 mixture of 2,2-dimethyl heptanoic acid, 2-methyl-2-ethyl hexanoic acid and 2-methyl-2-propyl pentanoic acid |
| 1-Octene | 1 | 94 | Same as above |
| 1-Decanol | 1 | 95 | A 8:4:2:1 mixture of 2,2-dimethyl nonanoic acid, 2-methyl-2-ethyl octanoic acid, 2-methyl-2-propyl heptanoic acid and 2-methyl-2-butyl hexanoic acid |
| 1-Decene | 1 | 78 | Same as above |
| Cyclohexenol | 1 | 80 | Methylcyclopentane carboxylic acid |
| Cyclohexene | 1 | 75 | Same as above |
| 2,5-Dimethyl cyclohexanol | 1 | 78 | 1,4-Dimethylcyclohexane carboxylic acid |

It is clear from the table given above that in the case of alcohols and olefins having small numbers of carbon atoms, favorable results are not obtained unless carbon monoxide is supplied under application of pressure and that in the case of starting materials having five or more carbon atoms, products are obtained in high yields under normal pressure.

When branched saturated compounds are used as starting materials in conjunction with alkyl cation-generating agents, the branched saturated compounds produce corresponding tertiary carboxylic acids in high yields at normal room temperature under the atmospheric pressure. The term "branched saturated compound" as herein used refers to a branched saturated hydrocarbon having at least one tertiary hydrogen atom, namely a hydrogen atom bonded to a tertiary carbon atom. The compound may be cyclic or acyclic. Typical examples of the compound include isobutane, 2-methyl pentane, 2-methyl heptane, iso-octane, methyl cyclohexane, 2,5-dimethyl hexane and 1,4-dimethyl cyclohexane.

As alkyl cation-generating agents, there can be used various olefins or alcohols. As previously described, an alkyl cation-generating agent, when placed in a strong acid, undergoes addition reaction and dehydration and converts itself into an alkyl cation. Between the alkyl cation and the branched saturated hydrocabon, there occurs transfer of hydrogen. The branched saturated hydrocarbon, upon loss of hydrogen to the alkyl cation, converts itself to a corresponding cation, which then reacts with carbon monoxide to give rise to a required tertiary carboxylic acid.

By way of example, a case in which methyl cyclohexane is used as the saturated compound for the reaction in the presence of an alkyl cation is cited below.

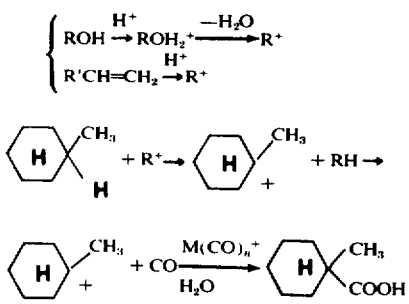

The alkyl cation produced from an alcohol or olefin extracts hydrogen from methyl cyclohexane. The methyl cyclohexane carbonium ion which is newly formed reacts with carbon monoxide to form methyl cyclohexane carboxylic acid.

The amount of the cation-generating agent to be added is desired to be such as to give a molar ratio of about 1:1 with reference to the branched saturated hydrocarbon used as the raw material.

When an unsaturated monocarboxylic acid is used as the starting material, the unsaturated bond in the carboxylic acid undergoes proton addition and converts itself to carbonium ion in the strong acid and the carbonium ion is subsequently isomerized into generally one or more tertiary carbonium ions, which react with carbon monoxide and become a dicarboxylic acid. As the unsaturated monocarboxylic acid, there are used various monocarboxylic acids, having unsaturated bonds in the molecular unit. For the reaction to be carried out under the atmospheric pressure, it is particularly desirable to use unsaturated monocarboxylic acids of the type which have four or more carbon atoms between the unsaturated bond and the carboxylic group. Examples of this type of monocarboxylic acids are oleic acid, 10-undecenoic acid, 11-dodecenoic acid and 12-tridecenoic acid. When there is used a carboxylic acid which has three or less carbon atoms between the unsaturated bond and the carboxylic group, the yield of the product is improved by allowing the reaction to proceed under slightly increased pressure.

Dicarboxylic acids or lactones are obtained in high yields when diolefins or dialcohols are used as the starting material. In the case of dienes or diols, there are used those which have two unsaturated bonds or two hydroxyl groups in the molecular unit. Examples of the diolefins are 1,5-hexadiene, 1,7-octadiene, 2,5-dimethyl-1,5-hexadine, 1,11-dodecadiene, 1,12-tridecadiene and limonene. Examples of the dialcohols are 1,7-heptane diol, 1,9-nonane diol, 1,10-decane diol and 2,10-dimethyl-undecane-2,10-diol. In such compound, when the number of carbon atoms intervening between the two double bonds or two hydroxyl groups within the molecular unit is not less than 6, carbon monoxide reacts with the two bonds or groups and forms predominantly a dicarboxylic acid. When the number of carbon atoms intervening between the two double bonds or hydroxyl groups in the molecular unit is 5 or less, carbon monoxide reacts with only one of the bonds or groups and produces predominantly a lactone. When 1,5-hexadiene is used, for example, there is chiefly obtained 2-ethyl-gamma-valerolactone. 2,10-Dimethylundecane-2,10-dicarboxylic acid is chiefly produced when there is used 2,10-dimethylundecane-2,10-diol.

Carbon monoxide to be used is required to have high purity when there is used copper of the lower valency. Presence of impurities in carbon monoxide is tolerable when silver compound is used alone or silver and copper are used in combination. The amount of the metal carbonyl to be formed is slightly increased by heightening the pressure with which carbon monoxide is supplied, though the dependency upon the pressure is not large. Sufficient supply of carbon monoxide to the reaction system can be made by connecting a carbon monoxide gas buret to the reaction system and replenishing the system with carbon monoxide as it is consumed with the progress of reaction.

Instead of directly supplying carbon monoxide to strong acid, substances which generate carbon monoxide when added to strong acid, such as formic acid, etc. may be utilized.

DESCRIPTION OF PREFERRED EMBODIMENTS:

One example of the method of reaction according to this invention will be cited herein below. First, a metal compound capable of forming a monovalent metal ion is placed in a strong acid and, with the acid kept under agitation, carbon monoxide is introduced to cause formation of a metal carbonyl in the strong acid. If the system is left to take its own course, the portion of the metal compound which has remained undissolved in the strong acid combines itself with carbon monoxide and forms a complex ion which is dissolved. Since the insolubles do not impede the reaction, there is no need for waiting for the metal compound to be thoroughly dissolved in the strong acid. Then, such hydrocarbon as alcohol or olefin is introduced in conjunction with carbon monoxide into the strong acid which now retains carbon monoxide in the form of metal carbonyl, the hydrocarbon immediately reacts with carbon monoxide to form a desired carboxylic acid or a derivative thereof. As carbon monoxide is introduced into the acid in conjunction with the raw material, it combines itself with the metal ion present in the strong acid and then reacts with the raw material. On completion of the reaction, the resulting reaction mixture is thrown into ice water and the reaction product is isolated by any of the known methods. The product which floats to the surface is separated directly. The product which remains dissolved in the solution is extracted by use of a solvent such as benzene or separated from the solution by means of steam distillation.

As is clear from the explanation given above, this invention causes a metal ion capable of forming a metal carbonyl to occur in a dissolved state in a strong acid, introduces carbon monoxide so as to allow a large amount of carbon monoxide to remain in the form of metal carbonyl dissolved in the strong acid and causes a starting material to react with the carbon monoxide to produce a corresponding carboxylic acid or derivative thereof. As carbon monoxide in the strong acid is consumed with the progress of said reaction, the metal ion resulting from the loss of carbon monoxide combines itself with carbon monoxide from the gaseous phase to form metal carbonyl again. Thus, carbon monoxide amply remains dissolved in the strong acid at all times. The reaction, therefore, can be carried out satisfactorily by merely having carbon monoxide supplied continuously in the gaseous state to the reaction system. Unlike the conventional method, the reaction of the present invention can be carried out without having to elevate the temperature or increase the pressure. This reaction can, therefore, obtain the desired carboxylic acid or derivative thereof selectively in high yields without entailing such secondary reactions as polymerization and isomerization.

Carboxylic acid thus obtained can be used for various purposes such as surface-active agents, soap, plasticizers, etc.

It is more difficult to react tertiary carboxylic acid than primary carboxylic acid. However, the derivatives of tertiary carboxylic acid are stable in their properties.

For example, ester of tertiary carboxylic acid is aromatic, and can be utilized as industrial perfume and masking agent. Since polyol-ester obtained by reacting polyol (ethylene-glycol, 1,2-propane-dithiol, glycerol, trimethylol-propane, etc.) with tertiary carboxylic acid is resistant to intense heat, it is utilized as high-grade lubricating oil.

Tertiary carboxylic acid is also utilized in the agricultural field. For example, it is mixed with paint for preventing the growth of mold, and is effective in preventing vermin from infesting wood.

Besides, metallic salt of tertiary carboxylic acid is usable as a paint-desiccating agent. Preferred embodiments of this invention will be described herein below. This invention is not limited in any way be these examples.

EXAMPLE 1

A mixture of 100 ml of 98% sulfuric acid with 1.50g of cuprous oxide and 1.25g of silver sulfate was placed in a 500-ml three-neck flask. The flask interior was evacuated and then 99% carbon monoxide (with air contained as impurity) was introduced. After about 1 hour of subsequent agitation, the flask contents were saturated with carbon monoxide. At this time, 23.5 ml of n-hexanol was added dropwise thereto. With carbon monoxide supplied as required from a gas buret, the flask contents were continuously agitated for 4 hours at normal room temperature under atmospheric pressure. At the end of the agitation, the reaction solution was thrown into ice water and then extracted with benzene. Consequently, there was recovered a 3:1 mixture of 2,2-dimethyl pentanoic acid and 2-methyl-2-ethyl butanoic acid. The acids thus formed were invariably tertiary carboxylic acids. The combined amount of the acids was 28g which corresponded to 92% of the theoretical yield calculated from the alcohol introduced into the flask.

EXAMPLE 2

A mixture of 100 ml of 100% sulfuric acid with 4g of cuprous oxide and 0.05g of aurous oxide ($Au_2O$) was placed in a 500-ml three-neck flask. After the flask interior had been displaced with carbon monoxide and the flask contents agitated for 30 minutes at 5°C to have carbon monoxide absorption reach a fixed level, 19 ml of decene-1 was added dropwise to the flask while having carbon monoxide supplied as required from a gas buret. The carbon monoxide absorption reached 80% of the theoretical value in 5 minutes and 97% in 10 minutes. At the end of 15 minutes, the reaction solution was thrown into a large volume of water, in which a 3:2 mixture of 2,2-dimethyl nonanoic acid and 2-methyl-2-ethyl octanoic acid floated to the surface to be recovered. The recovered acids were invariably tertiary carboxylic acids. The combined amount of the acids was 18.9g which corresponded to 98% of the theoretical value based on the absorbed carbon monoxide and to 95% of the theoretical value based on the used olefin.

EXAMPLE 3

In a solvent prepared by adding 20 ml of fuming sulfuric acid to 80 ml of 100% sulfuric acid, 2.32g of silver oxide and 0.01g of aurous oxide ($Au_2O$) were mixed. The mixture was placed in a 500-ml three-neck flask. The flask interior was displaced with carbon monoxide and the flask contents were left to absorb carbon monoxide to saturation for about one hour. Into the solvent in the flask was dropwise introduced 17.1 ml of n-butanol while having carbon monoxide supplied as required from a gas buret. Thereafter, the agitation of the flask contents was continued for about 5 hours. On completion of the reaction, the reaction solution was thrown into ice water and then extracted with benzene. Consequently, 10g of pivalic acid was obtained. When the water phase was additionally treated by steam distillation, about 3g of pivalic acid was obtained from the resultant distillate. Thus, a total of 13g of pivalic acid was recovered, which corresponded to about 55% of the theoretical value based on the alcohol used.

EXAMPLE 4

A mixture of 100 ml of 98% sulfuric acid with 0.7g of cuprous oxide and 0.2g of silver oxide was placed in a 500-ml three-neck flask. The flask contents were agitated for about 30 minutes under simultaneous introduction of carbon monoxide to have carbon monoxide absorbed to saturation. Thereafter, 2.24l of butene-1 gas was introduced into the contents which were kept cooled. The butene-1 gas was immediately absorbed by sulfuric acid with evolution of heat. After all the butene-1 gas had been absorbed, the flask contents were agitated for 1 hour while under introduction of carbon monoxide, with the temperature kept at 30°–35°C. On completion of the reaction, the reaction solution was thrown into water and diluted. The reaction product was recovered by repeating the procedure of Example 3. The approximately 4g of carboxylic acid formed was solely pivalic acid. The yield corresponded to about 40% of the theoretical value based on the used olefin.

EXAMPLE 5

In a reactor made of trifluorochloride resin, 100 ml of hydrogen fluoride (anhydride) and 2.86g of cuprous oxide were placed and agitated for 30 minutes at 0°C under introduction of carbon monoxide. Thereafter, 11 ml of amyl alcohol was introduced and the agitation of the contents of the reactor was continued for 30 minutes while under introduction of carbon monoxide. On completion of the reaction, the greater part of hydrogen fluoride was transferred to a second vessel and the residual solution was thrown into ice water and diluted, with the reaction product extracted with benzene. Consequently, there were obtained 4g of 2,2-dimethyl butanoic acid and 3g of pivalic acid. The yields corresponded to about 65% of the theoretical value of tertiary carboxylic acids based on the used alcohol.

EXAMPLE 6

In a 500-ml three-neck flask, 50 ml of phosphoric acid, 40g of boron fluoride-acetic acid complex and 4g of cuprous oxide were placed and, with the flask interior displaced with carbon monoxide, agitated for about one hour. Then, 31.5 ml of 2-ethylhexene-1 was introduced dropwise at 20°C while under continued supply of carbon monoxide and the flask contents were agitated at the same time. A reaction immediately ensued. The reaction solution was transferred into ice water and the reaction product was extracted with benzene. Consequently, there was obtained 26.8g of tertiary $C_9$ acid (3:1 mixture of 2,2-dimethyl heptanoic acid and 2-methyl-2-ethyl-hexanoic acid). The yield was 85%.

EXAMPLE 7

In a three-neck flask, 100 ml of 98% sulfuric acid, 2g of cupric oxide and 1.5g of copper dust were placed and, after evacuating the flask interior by a vacuum pump, vigorously agitated for one hour while under continuous introduction of carbon monoxide. Thereafter, 31.5 ml of octene-1 was introduced dropwise at 20°C while under continued supply of carbon monoxide from a gas buret. A reaction immediately ensued and carbon monoxide was abruptly absorbed. After 1 hour of reaction, the reaction solution was transferred into ice water and extracted with benzene. Consequently, there was obtained 30.6g of tertiary $C_9$ carboxylic acid (3:1 mixture of 2,2-dimethyl heptanoic acid and 2-methyl-2-ethyl hexanoic acid). The yield was 97%.

EXAMPLE 8

In a three-neck flask, 100 ml of 98% sulfuric acid and 3.8g of copper dust were placed and, with the flask interior evacuated by a vacuum pump, agitated while under introduction of carbon monoxide. When 25 ml of n-hexanol was introduced dropwise, a reaction immediately ensued. After 1 hour of the reaction, the reaction solution was transferred into ice water and then extracted with benzene. Consequently, there was obtained 22.4g of tertiary $C_7$ carboxylic acid (3:1 mixture of 2,2-dimethyl pentanoic acid and 2-methyl-2-ethyl butanoic acid). The yield was 90%.

EXAMPLE 9

In a reactor made of Daiflon (Daikin Kogyo Co., Ltd's product of chlorofluoro-hydrocarbon), 20 ml of 98% sulfuric acid, 50 ml of 100% hydrogen fluoride, 8g of basic copper carbonate ($CuCO_3 \cdot Cu(OH)_2$) and 2g of copper dust were placed and, with the reactor interior evacuated, agitated while under introduction of carbon monoxide. Thereafter, 38 ml of decene-2 was introduced dropwise under continued supply of carbon monoxide and the reactor contents were agitated at 15°C to effect reaction. The reaction terminated in one hour. Thereafter, hydrogen fluoride was separated through distillation at 20°C and transferred into a separate vessel for reuse. The remaining reaction solution was thrown into ice water and extracted with benzene. Consequently, there was obtained 36.5g of tertiary $C_{11}$ carboxylic acid (4:2:1 mixture of 2,2-dimethyl nonanoic acid, 2-methyl-2-ethyl octanoic acid and 2-methyl-2-propyl heptanoic acid). The yield was 98%.

EXAMPLE 10

In a 1-liter three-neck flask, 100 ml of 98% sulfuric acid and 4g of silver oxide were placed, a mixed gas consisting of 90% of carbon monoxide and 10% of air was introduced and the flask contents were vigorously agitated for 7 minutes. Then, a mixture consisting of 24.8 ml of hexene-1 and 25.4 ml of methyl cyclohexane was gradually introduced dropwise. After completion of the dropwise introduction, the flask contents were agitated for 30 minutes. Then, the reaction solution was removed into ice water and extracted with benzene. Consequently, there were obtained 18.5g of methyl cyclohexane carboxylic acid and 7.5g of tertiary $C_7$ carboxylic acid (2:1 mixture of 2,2-dimethyl pentanoic acid and 2-methyl-2-ethyl butanoic acid).

The yield of methyl cyclohexane carboxylic acid was 65% based on methyl cyclohexane used as the starting material.

EXAMPLE 11

In three 500-ml three-neck flasks, A, B and C, 106 mol (2 mols) each of 98% sulfuric acid was placed. The flasks A and B were evacuated by a vacuum pump and then carbon monoxide was introduced. In the last flask C, 3.5g (0.024 mol) of cuprous oxide was added, the flask interior was evacuated by a vacuum pump and carbon monoxide was introduced to have copper absorb carbon monoxide for 1 hour. Thereafter, the three flasks were held at 35°C under one atmosphere of carbon monoxide, while 13.2 mol (0.1 mol) of 2-methyl pentane was gradually introduced dropwise into the flask A and a mixture of 13.2 ml (0.1 mol) of 2-methyl pentane and 18.5 ml (0.1 mol) of octene-1 into each of the flasks B and C. Then, the contents of these flasks were vigorously agitated for 1 hour while under continued introduction of carbon monoxide. After completion of the reaction, the reaction solutions were removed into ice water and the reaction products were extracted with benzene. The reaction products from teh flasks A, B and C and their yields were shown in Table 8.

Table 8

| | Starting material | Catalyst | Product | Yield |
|---|---|---|---|---|
| A | 2-Methyl pentane | None | None | 0 |
| B | 2-Methyl pentane and octene-1 | None | Tertiary $C_9$ acid | 3% |
| C | 2-Methyl Pentane and octene-1 | Cuprous oxide | 2,2-Dimethyl pentanoic acid 7.3g | 57% |
| | | | 2-Methyl-2-ethyl-butanoic acid 2.4g | 18% |
| | | | 2,2-Dimethyl heptanoic acid 2.5g | 15% |
| | | | 2-Methyl-2-ethyl hexanoic acid 1.6g | 9% |

EXAMPLE 12

In a 500-ml three-neck flask, 106 ml (2 mols) of 98% sulfuric acid and 4g of cuprous oxide were placed and agitated for one hour while under continued introduction of carbon monoxide to have carbon monoxide absorbed therein. Thereafter, a mixture consisting of 12.4 ml (0.1 mol) of hexene-1 and 12.8 ml (0.1 mol) of methyl cyclohexane was gradually introduced dropwise at 40°C under 1 atmosphere and the flask contents were vigorously agitated for 70 minutes to have carbon monoxide absorbed therein. After completion of the reaction, the reaction solution was transferred into ice water and the reaction products were extracted with benzene. Consequently obtained were 10g (70%) of methyl cyclohexane carboxylic acid (I), 2.7g (21%) of 2,2-dimethyl pentanoic acid (II) and 1.2g (9%) of 2-methyl-2-ethylbutanoic acid (III). The same procedure was repeated, except the concentration of sulfuric acid was changed to 93%, 85% and 80%. The yields of the products (I), (II) and (III) were as shown in Table 9.

Table 9

|  | 93% Sulfuric acid | 85% Sulfuric acid | 80% Sulfuric acid |
|---|---|---|---|
| Methyl cyclohexane carboxylic acid (I) | 45% | 20% | 5% |
| 2,2-Dimethyl pentanoic acid (II) | 10% | 6% | 1% |
| 2-Methyl-2-ethyl butanoic acid (III) | 4% | 2% | 0% |

EXAMPLE 13

In a 500-ml three-neck flask, 106 ml (2 mols) of 98% sulfuric acid and 4.29g (0.03 mol) of cuprous oxide were placed and, with the flask interior evacuated by a vacuum pump, agitated for one hour while under continued introduction of carbon monoxide. Thereafter, a mixture of 12.8 ml (0.1 mol) of methyl cyclohexane and 9.4 ml (0.1 mol) of tertiary butanol was gradually introduced dropwise at 45°C under 1 atmosphere while under continued supply of carbon monoxide. The flask contents were vigorously agitated for 60 minutes to have carbon monoxide absorbed therein. After completion of the reaction, the reaction solution was transferred into ice water and the reaction products were extracted with benzene. Consequently, there were obtained 10 (70%) g of methyl cyclohexane carboxylic acid (I) and 2g (20%) of pivalic acid (II). The same procedure was repeated, except the reaction temperature was changed to 60°C, 30°C, 20°C and 5°C. The yields of the products (I) and (II) were as shown in Table 10.

Table 10

|  | 60°C | 30°C | 20°C | 5°C |
|---|---|---|---|---|
| I | 5% | 40% | 20% | 3% |
| II | 2% | 10% | 5% | 1% |

EXAMPLE 14

In a 500-ml three-neck flask, 106 ml (2 mols) of 98% sulfuric acid and 5g of cuprous sulfate were placed and treated by following the procedure of Example 13 to form copper carbonyl. Thereafter, a mixture consisting of 12.8 ml (0.1 mol) of methyl cyclohexane and 15.3 ml (0.2 mol) of isopropanol was gradually introduced dropwise at 45°C under 1 atmosphere of carbon monoxide. After two hours of the reaction, the reaction solution was removed into ice water and the reaction products were extracted with benzene. Consequently, there were obtained 8.63g (60%) of 1-methyl cyclohexane carboxylic acid and 3.5g (20%) of isobutyric acid.

EXAMPLE 15

In a reactor made of Daiflon, 50 ml of 96% hydrogen fluoride and 3g of cuprous oxide were placed and treated by following the procedure of Example 13 to form copper carbonyl. Thereafter, a mixture consisting of 6.3 ml of methyl cyclohexane and 4.7 ml of tertiary butanol was gradually introduced dropwise at 15°C under one atmosphere of carbon monoxide. The reactor contents were vigorously agitated for 1 hour to have carbon monoxide absorbed therein. Thereafter, the reaction solution was transferred into ice water and the reaction products were extracted with benzene. Consequently, there were obtained 2.2g of 1-methyl cyclohexane carboxylic acid and 0.8g of pivalic acid.

EXAMPLE 16

In a 500-ml three-neck flask, 60 ml of 98% sulfuric acid and 10 ml of boron fluoride etherate were placed and treated by following the procedure of Example 13 to form copper carbonyl. Thereafter, a mixture of 10 ml of isooctane and 9 ml of hexene-1 was gradually introduced dropwise at 40°C under 1 atmosphere. The flask contents were vigorously agitated for 1.5 hours while under introduction of carbon monoxide. Then, the reaction solution was transferred into ice water and the reaction products were extracted with benzene. Consequently, there were obtained 4g of 2,2-dimethyl heptanoic acid, 1g of 2,2-dimethyl pentanoic acid and 0.4g of 2-methyl-2-ethyl butanoic acid.

EXAMPLE 17

In a 1.5-liter autoclave, 150 ml of 98% sulfuric acid and 4g of cuprous oxide were placed, carbon monoxide was compressed to 3 atmospheres and the autoclave contents were agitated for about 1 hour. Thereafter, 20 ml of n-propanol was added thereto at 35°C and carbon monoxide was further compressed to 10 atmospheres and the autoclave contents were again agitated. After one hour of reaction, the reaction solution was removed into ice water and repeatedly extracted with benzene. Consequently, there was obtained 22.0g of isobutyric acid. The yield was 97%. The same procedure was repeated, except the carbon monoxide pressure was changed variously. The results were as shown in Table 11.

Table 11

| Carbon monoxide pressure (atmosphere) | Yield of isobutyric acid (%) |
|---|---|
| 2 | 20 |
| 5 | 70 |
| 10 | 97 |
| 20 | 98 |
| 30 | 99 |

EXAMPLE 18

In a 2.5-liter autoclave, 100 ml of 98% sulfuric acid and 3g of silver oxide were placed and agitated for about 10 minutes in the presence of 2 atmospheres of carbon monoxide. Thereafter, 2.24 liters of propylene was introduced and carbon monoxide was further compressed to 10 atmospheres. The autoclave contents were agitated for 1 hour at 40°C. The reaction solution was transferred into ice water and repeatedly extracted with benzene. Consequently, 8.5g of isobutyric acid was obtained. The yield was 98%. The same procedure was repeated, except the reaction temperature was varied. The results were as shown in Table 12.

Table 12

| Temperature (°C) | Yield of isobutyric acid (%) |
|---|---|
| 0 | 40 |
| 20 | 82 |
| 30 | 96 |
| 60 | 30 |
| 80 | 3 |

EXAMPLE 19

In a reactor made of Daiflon, 100 ml of 100% hydrogen fluoride and 3g of cuprous sulfate were placed and allowed to absorb carbon monoxide at 10°C. Thereafter, 44 ml of isoamyl alcohol was introduced and carbon monoxide compressed to 3 atmospheres and the autoclave contents were agitated for 1 hour to effect reaction. After completion of the reaction, hydrogen fluoride was distilled at a temperature above 20°C and removed into a separate reactor for reuse. The remaining reaction solution was removed into ice water and the reaction product was extracted with benzene. Consequently, there was obtained 42g of 2,2-dimethyl butanoic acid. The yield was 90%.

EXAMPLE 20

In a 1.5-liter autoclave, 100 ml of 98% sulfuric acid, 2.54g of copper dust and 3.16g of cupric oxide were placed and with the autoclave interior evacuated, exposed to contact with 3 atmospheres of carbon monoxide to form copper carbonyl. Thereafter, 2.24 liters of butene-1 was introduced under pressure and carbon monoxide further introduced to a total of 6 atmospheres and the autoclave contents were agitated for about 1 hour to effect reaction. After the reaction, the reaction solution was transferred into ice water and the reaction product was extracted with benzene. Consequently, there was obtained 10.1g of pivalic acid. The yield was 97%. The same procedure was repeated, except the concentration of sulfuric acid was varied. The results were as shown in Table 13.

Table 13

| Sulfuric acid concentration (%) | Yield of pivalic acid (%) |
|---|---|
| 100 | 98 |
| 95 | 90 |
| 85 | 40 |
| 80 | 10 |
| 70 | 1 |

EXAMPLE 21

In a three-neck flask, 105 ml of 100% sulfuric acid and 2.86g of cuprous oxide were placed and vigorously agitated in the presence of carbon monoxide to have carbon monoxide absorbed therein to form copper carbonyl ion. Thereafter, 36.8g of 10-undecenoic acid was introduced by the use of a solid specimen spoon and the flask contents were agitated to effect reaction. After the absorption of carbon monoxide by 1-undecenoic acid was brought to completion, the reaction solution was removed into ice water and the reaction product was extracted with benzene. Consequently, there was obtained 40g of $C_{12}$ dicarboxylic acid (composed preponderantly of $\alpha\alpha$-dimethylsebacic acid and incorporating $\alpha$-methyl-$\alpha$-ethyl azelaic acid). The yield was 85%. When this reaction was carried out in the same autoclave under 3 atmospheres of carbon monoxide, there was obtained 44.5g of $C_{12}$-dicarboxylic acid. The yield was 95%.

EXAMPLE 22

The reaction of Example 21 was carried out (under 1 atmosphere of carbon monoxide) by repeating the procedure of Example 21, except 4.64g of silver oxide was used in place of 2.86g of cuprous oxide. Consequently, there was obtained $C_{12}$-dicarboxylic acid at an yield of 80%.

The same reaction was carried out by following the same procedure, except the incorporation of cuprous oxide was omitted and the pressure of carbon monoxide was fixed at one atmosphere and 150 atmospheres respectively. The yield of $C_{12}$-dicarboxylic acid was 5% where the pressure of carbon monoxide was 1 atmosphere and 50% where the pressure was 150 atmospheres respectively.

EXAMPLE 23

In a three-neck flask, 40 ml of boron trifluoride-acetic acid complex, 60 ml of 100% sulfuric acid and 6g of silver sulfate were placed and vigorously agitated in the presence of carbon monoxide to have carbon monoxide absorbed therein and form silver carbonyl ion. Thereafter, 31.6 ml of oleic acid was gradually introduced dropwise and the flask contents were vigorously agitated in the presence of carbon monoxide to have carbon monoxide absorbed therein. After completion of the reaction, the reaction solution was removed into ice water and the reaction product was extracted with benzene. Consequently, there was obtained 26g of brown $C_{19}$ dicarboxylic acid. The yield was 80%.

EXAMPLE 24

In a three-neck flask, 105 ml of 98% sulfuric acid and 4.3g of cuprous oxide were placed and, with the flask interior evacuated, vigorously agitated while under continued introduction of carbon monoxide from a gas reservoir to have carbon monoxide absorbed therein. Thereafter, with the introduction of carbon monoxide continued, 20 ml of 1,5-hexadiene was gradually introduced dropwise at 20°C and the reaction which ensued was allowed to continue for 2 hours. After completion of the reaction, the reaction solution was poured into ice water and extracted with benzene. Consequently, there was obtained 9.7g of α-ethyl-γ-valerolactone. The yield was 45%. When this reaction was carried out in a 2-liter autoclave under 10 atmospheres of carbon monoxide, there was obtained 20.5g of α-ethyl-γ-valerolactone. The yield was 95%.

EXAMPLE 25

In a 1.5-liter autoclave, 100 ml of 96% sulfuric acid and 4.5g of silver oxide were placed and, with the autoclave interior evacuated, vigorously agitated for 30 minutes while under introduction of 2 atmospheres of carbon monoxide. Thereafter, 20 ml of 1,7-heptandiol was introduced at 30°C under 10 atmospheres of carbon monoxide and the autoclave contents were vigorously agitated to effect reaction. At the end of 2 hours of reaction, the reaction solution was transferred into ice water. It gave forth an aromatic scent. The reaction solution was extracted with benzene. Consequently, there were obtained 12.8g (60% of yield) of α-methylethyl-δ-valerolactone and 3.8g (12%) of a mixture of other lactones.

EXAMPLE 26

In a reactor made of Daiflon, 1.9g of copper dust, 7.5g of cupric sulfate and 0.5g of aurous oxide were placed and, with the reactor interior evacuated, 20 ml of fluosulfonic acid and 80 ml of hydrogen fluoride were introduced at 0°C and the reactor contents were vigorously agitated for 20 minutes while under introduction of carbon monoxide. Thereafter, 24g of 1,9-nonanediol was added at 15°C and the reactor contents were vigorously agitated under 3 atmospheres of carbon monoxide to effect reaction. After completion of the reaction, the reactor was brought to 25°C to have hydrogen fluoride distilled out into a separate reactor and the residual solution was thrown into ice water, with the reaction products extracted with benzene. Consequently, there were obtained 12.7g (50% of yield) of an eight-member ring lactone having a methyl-ethyl branch at the α position and 5.1g (20% of yield) of a mixture of other lactones.

EXAMPLE 27

In a 1-liter autoclave, 100 ml of 100% sulfuric acid and 3g of cuprous oxide were placed and treated under 3 atmospheres of carbon monoxide to form copper carbonyl ion. Subsequently, a solution having 22g of 2,10-dimethyl undecane-2,10-diol dissolved in 50 ml of sulfuric acid was introduced dropwise through a specimen port at 30°C under 3 atmospheres of carbon monoxide and the autoclave contents were agitated to effect reaction. After completion of the reaction, the reaction solution was removed into ice water and extracted with benzene. Consequently, there was obtained 23g of 2,10-dimethylundecane-2,10-dicarboxylic acid. The yield was 83%.

EXAMPLE 28

In an autoclave, 50 ml of boron trifluoride-acetic acid complex 50 ml of 100% sulfuric acid and 3.5g of silver oxide were placed and treated while under introduction of carbon monoxide to form silver carbonyl ion. Subsequently, 24 ml of 1,11-dodecadiene was gradually introduced dropwise at 5°C under 2 atmospheres of carbon monoxide and the autoclave contents were vigorously agitated to effect reaction. After completion of the reaction, the reaction solution was removed into ice water and the reaction product was extracted with benzene. Consequently, there was obtained 16g of tertiary $C_{14}$ dicarboxylic acid.

EXAMPLE 29

In a 1-liter three-neck flask, 100 ml of 100% sulfuric acid and 3g of cuprous oxide were placed and then treated under introduction of carbon monoxide to form copper carbonyl ion. Subsequently, 20 ml of 1,11-dodecadiene was gradually introduced dropwise at 10°C under 1 atmosphere of carbon monoxide and the autoclave contents were vigorously agitated to effect reaction. After completion of the reaction, the reaction solution was transferred into ice water and the reaction product was extracted with benzene. Consequently, there was obtained 20.5g of tertiary $C_{14}$ dicarboxylic acid. The yield was 70%.

EXAMPLE 30

The reaction of Example 29 was carried out by following the same procedure, except 4g of silver sulfate was used in place of 3g cuprous oxide and carbon monoxide was used at a pressure of 4 atmospheres. Consequently, there was obtained 22g of tertiary $C_{14}$ dicarboxylic acid at a yield of 90% from 1,11-dodecadiene.

The same reaction was carried out by following the same procedure, except the incorporation of cuprous oxide was omitted and the pressure of carbon monoxide was fixed at 1 atmosphere and 50 atmospheres respectively. Consequently, the yield of tertiary $C_{14}$ dicarboxylic acid was 5% where the pressure of 1 atmosphere and 20% where the pressure was 50 atmospheres.

What is claimed is:

1. In a method for chemically adding carbon monoxide to olefins in strong acids for thereby manufacturing carboxylic acids or derivatives thereof corresponding to said starting materials, the improvement which comprises (1) having copper, copper compounds or mixtures thereof added in the presence of carbon monoxide to at least one strong acid selected from the group consisting of sulfuric acid, and boron fluoride complexes for thereby forming a metal carbonyl therein, (2) introducing said starting material into the strong acid containing the metal carbonyl in the presence of carbon monoxide at temperatures of 0°–50°C, and (3) separating from the resultant reaction solution a carboxylic acid or derivative aimed at.

2. A method according to claim 1, wherein copper metal is added in amounts in the range of 0.001–2.0 mol per liter of the strong acid.

3. A method according to claim 1, wherein carbon monoxide is caused to exist at a pressure in the range of from one atmosphere to 10 atmospheres.

4. A method according to claim 1, wherein olefins having not less than 4 carbon atoms are used as starting materials to produce corresponding tertiary carboxylic acids.

5. A method according to claim 1, wherein olefins having not more than 5 carbon atoms are used as starting materials to produce corresponding lower carboxylic acids under pressurized carbon monoxide.

6. A method according to claim 1, wherein diolefins are used as starting materials to produce corresponding dicarboxylic acids or lactones.

7. A method according to claim 1, wherein copper metal is added in the presence of carbon monoxide and said strong acid.

* * * * *